United States Patent [19]

Reinicke et al.

[11] Patent Number: 5,024,418
[45] Date of Patent: Jun. 18, 1991

[54] FLUID FLOW RATE CONTROL DEVICE

[75] Inventors: Robert H. Reinicke, Mission Viejo; Rafic Mohtar, Redondo Beach; Richard O. Nelson, Torrance, all of Calif.

[73] Assignee: Eaton Corporation, Cleveland, Ohio

[21] Appl. No.: 404,296

[22] Filed: Sep. 7, 1989

[51] Int. Cl.⁵ .............................................. F16K 31/04
[52] U.S. Cl. ......................... 251/129.11; 251/129.05; 251/294; 251/129.14
[58] Field of Search .............. 251/129.11, 294, 129.05, 251/129.14

[56] References Cited

U.S. PATENT DOCUMENTS

| | | | |
|---|---|---|---|
| 3,425,447 | 2/1969 | McCullough | 137/625.12 |
| 4,452,423 | 6/1984 | Beblavi et al. | 251/65 |
| 4,613,798 | 9/1986 | Baumann | 318/160 |
| 4,723,754 | 2/1988 | Torimoto et al. | 151/129.05 |
| 4,735,233 | 4/1988 | Nogami et al. | 137/625.65 |

Primary Examiner—Arnold Rosenthal
Attorney, Agent, or Firm—L. G. Vande Zande

[57] ABSTRACT

A poppet is modulated between closed and full open positions by a brushless DC motor operating magnetically through a housing to drive a permanent magnet rotor which carries the poppet. The rotor is supported on several parallel cables which are stationarily fixed at one end and attached to the rotor at the other end, whereby rotation of the rotor twists the cables, causing axial foreshortening and axial translation of rotor and poppet. Axial translation is enhanced by placing a spacer between the cables, intermediate their ends. A permanent magnet ring is disposed around the valve seat directly axially attracting the rotor to a valve closed position.

17 Claims, 5 Drawing Sheets

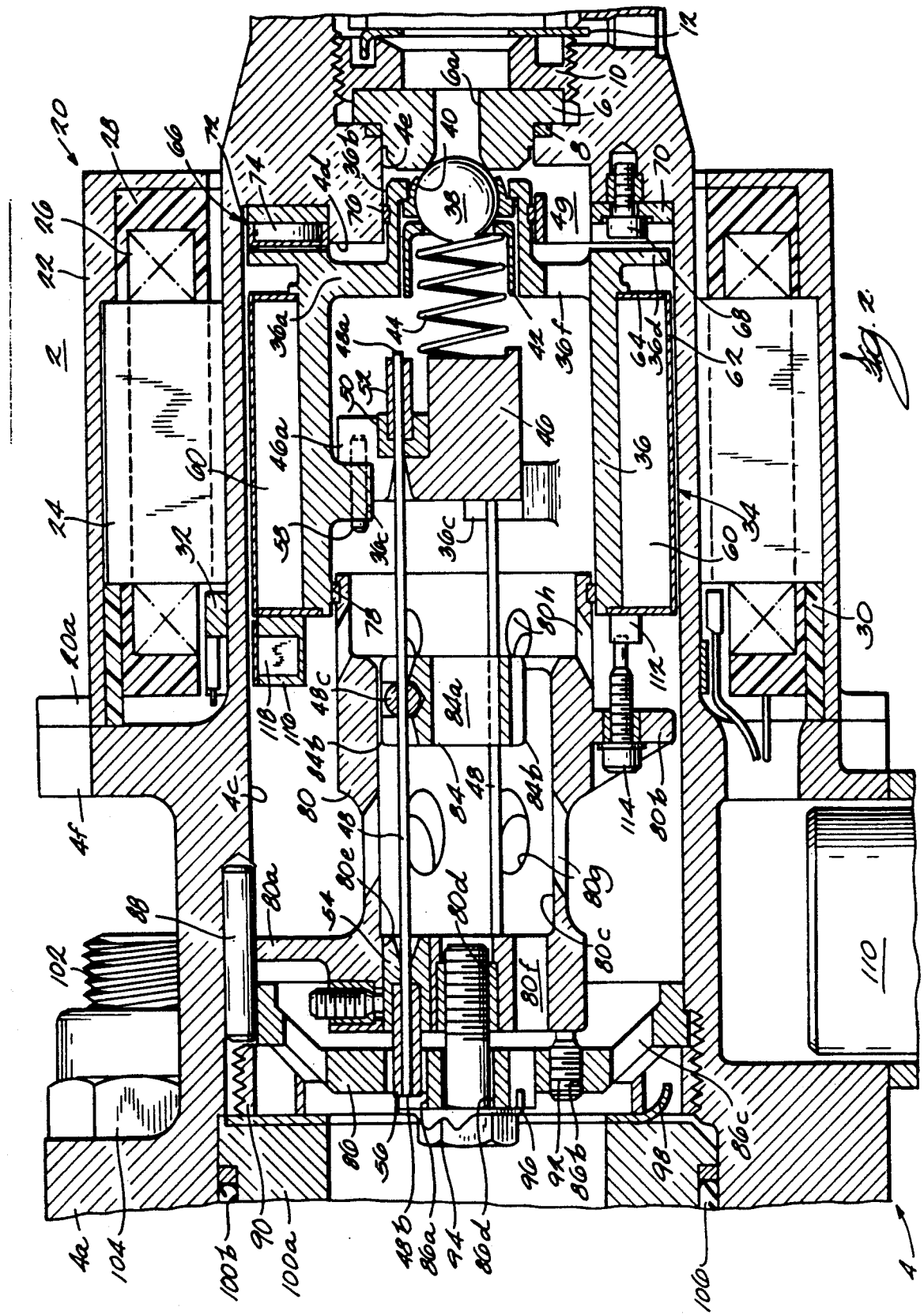

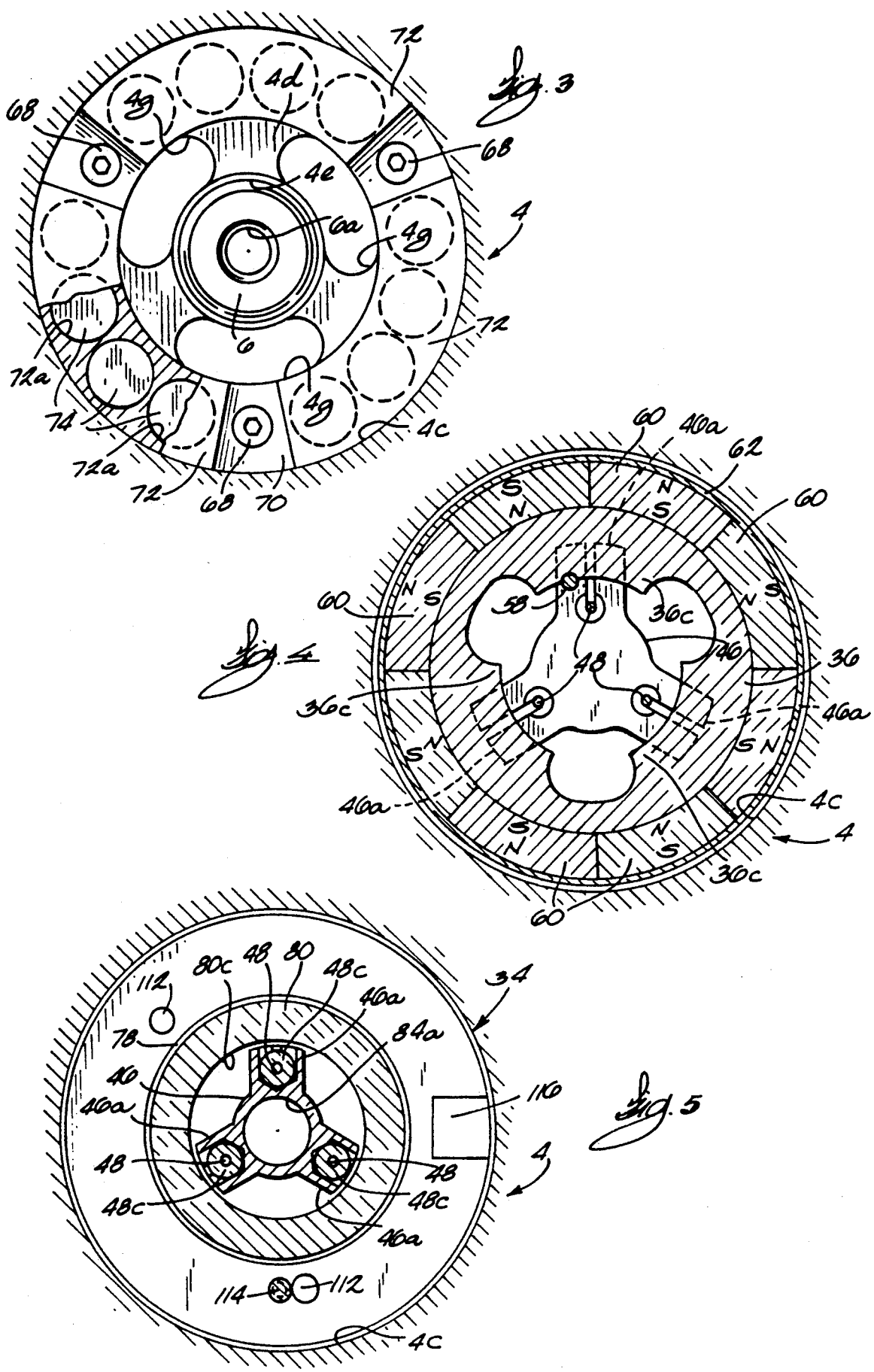

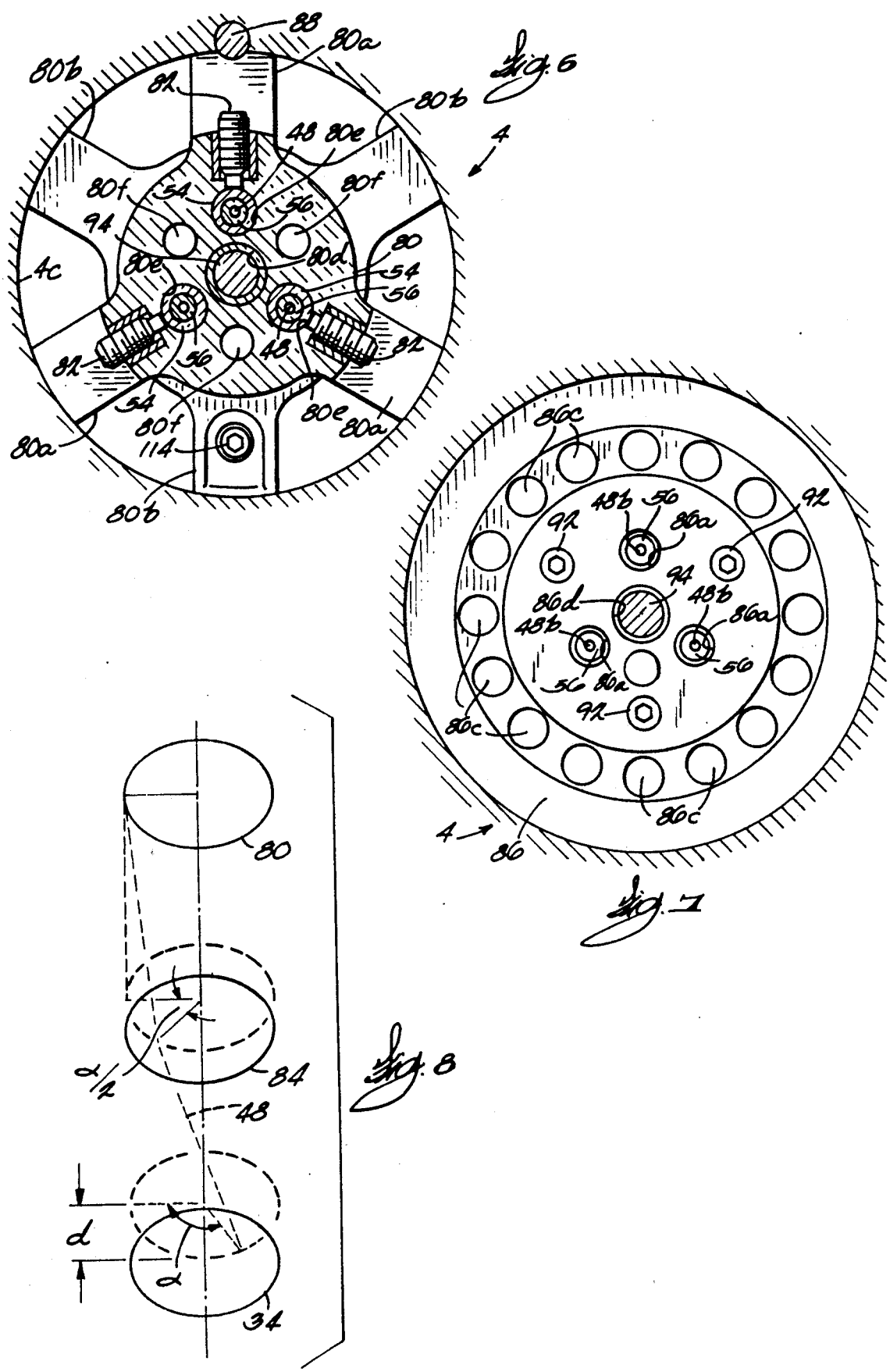

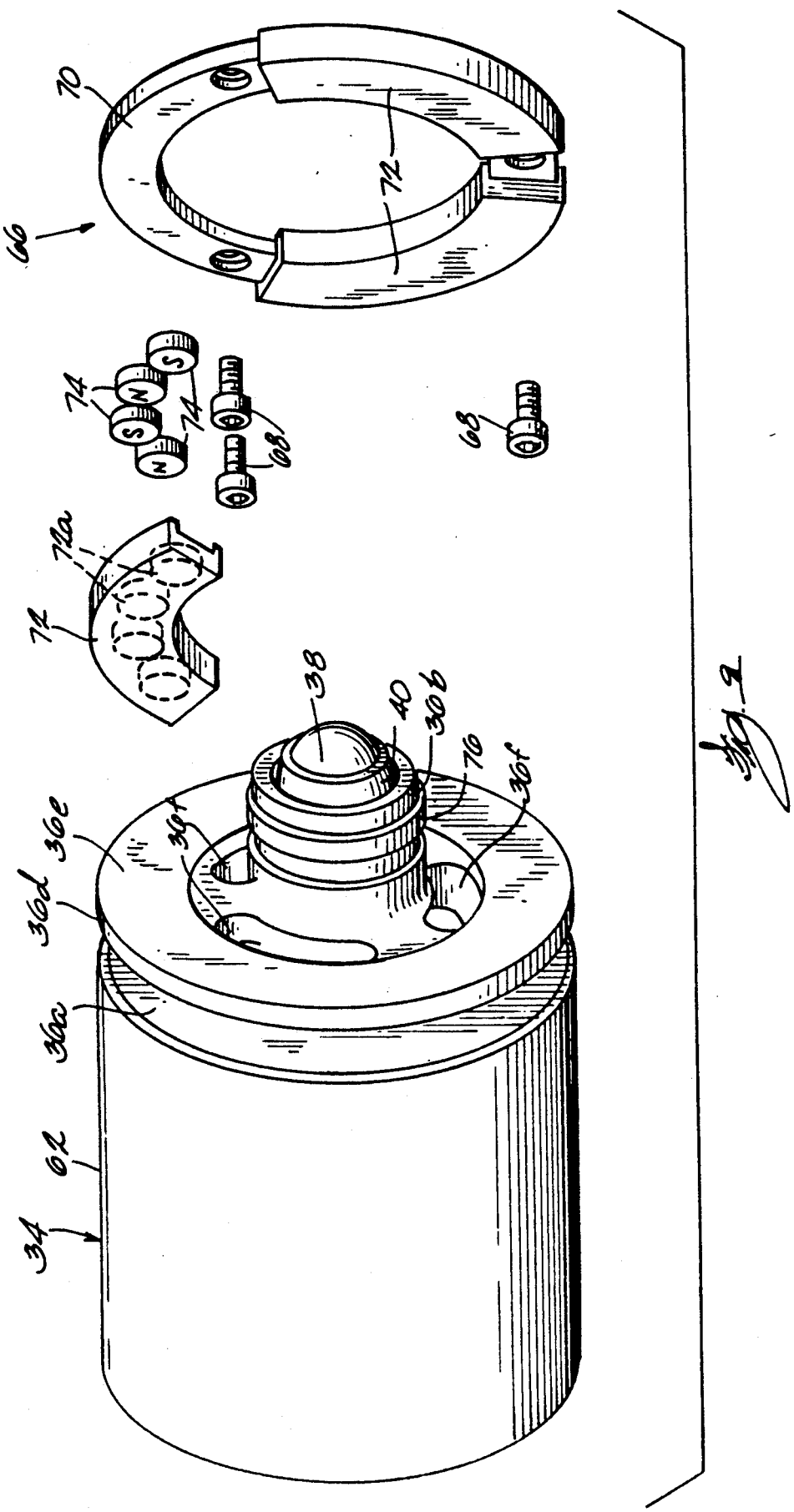

FLUID FLOW RATE CONTROL DEVICE

The U.S. Government has a paid-up license in this invention and the right in limited circumstances to require the patent owner to license others on reasonable terms as provided for by the terms of contract No. NAS9-17909 awarded by NASA.

CROSS REFERENCE TO RELATED APPLICATIONS

This application is related to U.S. patent application entitled "Fluid Control Device", Ser. No. 07/147,829 filed Jan. 25, 1988 in the names of Robert H. Reinicke and Jefferson Y. S. Yang, allowed June 12, 1989, now U.S. Pat. No. 4,892,286 the disclosure of which is incorporated herein by reference. This application is also related to co-pending U.S. patent application entitled "Fluid Control Device", Ser. No. 07/385,748 pending, filed July 26, 1989 in the names of Robert H. Reinicke and Jefferson Y. S. Yang, which application is a division of Ser. No. 07/147,829 above.

BACKGROUND OF THE INVENTION

This invention relates to fluid flow rate control devices, in particular valves, wherein a partial-revolution DC motor controls the rotation of a poppet-carrying rotor within the valve and means are provided for effecting axial translation of the rotor in response to its rotation. Specifically, this invention relates to magnetic biasing of the rotor to one extreme axial position thereof wherein the poppet closes the valve structure and to an arrangement of elements which provide axial translation of the rotor and poppet in response to rotation of the rotor.

Fluid flow rate control devices of the type to which this invention is related provide a modulating valve to regulate the flow of such fluids. The fluids may be corrosive and/or flammable in nature and therefore the portions and elements of the valve in contact with the fluid must be corrosion resistant and, to the extent possible, should avoid small fluid passages and relative movement between closely toleranced elements whereby operation of the device will not be adversely affected by contamination build-up. It is also important that the fluid flow rate control device be capable of maintaining a closed condition under vibration and power-loss conditions. The fluid controlled by devices of this type is often under high pressure, tending to maintain the valve in its closed condition, but also establishing a very high head pressure closing force which the valve opening mechanism structure must overcome when opening the valve from a closed position. It is preferable that the valve opening mechanism provide variable "lead", or "lift per revolution" i.e. to provide increasing axial movement in the opening direction in response to a constant rotation of the rotor, thereby to provide maximum force to operate the poppet in an axial direction initially when the fluid pressure is its greatest, and to thereafter reduce the poppet operating force as the valve opens and the fluid pressure reduces.

SUMMARY OF THE INVENTION

This invention provides a fluid flow rate control device employing a valve actuated by a brushless DC motor comprising a poppet carried by a rotor mounted for axial and rotary movement to regulate the orifice of the valve. The rotor comprises an annular shoulder of corrosion resistant ferromagnetic material and is biased to an extreme axial position, whereat the valve is closed, by a permanent magnet arrangement affixed to an end wall of the valve housing which is proximate the valve seat, thereby providing an axially directed attraction to the rotor. A valve opening mechanism comprises a plurality of flexible bands which are fixed at one end to the rotor at respective angular intervals at a predetermined radius and are affixed at their other ends relative to said housing at corresponding angular intervals and radial spacings such that the bands extend parallel to a rotational axis of the rotor and to each other, the opposite ends of the respective bands being correspondingly axially aligned. Rotation of the rotor effects twisting of the bands from their parallel disposition to effect foreshortening thereof in an axial direction and thereby, axial translation of the rotor away from the valve seat. A spacer is attached between and to the flexible bands intermediate the respective opposite ends thereof to modify the amount of twisting accomplished in response to a specific arcuate rotation of the rotor, particularly in the interval between the spacer and the rotor, to increase the axial translation with regard to a constant arcuate rotation as the poppet of the valve approaches the open position.

These and other features and advantages of the fluid rate control device of this invention will become more apparent in the following description and claims when read in conjunction with the accompanying drawings.

BRIEF DESCRIPTION OF THE DRAWINGS

FIG. 2 is a view of a portion of the fluid flow rate control device of FIG. 1 drawn to an enlarged scale;

FIG. 3 is a cross sectional view of the fluid flow rate control device of this invention taken along the line 3—3 in FIG. 1;

FIG. 4 is a cross sectional view of the fluid flow rate control device of this invention taken along the line 4—4 in FIG. 1;

FIG. 5 is a cross sectional view of the fluid flow rate control device of this invention taken along the line 5—5 in FIG. 1;

FIG. 6 is a cross sectional view of the fluid flow rate control device of this invention taken along the line 6—6 in FIG. 1;

FIG. 7 is a cross sectional view of the fluid flow rate control device of this invention taken along the line 7—7 in FIG. 1;

FIG. 8 is a schematic view depicting the valve opening mechanism of the fluid flow rate control device of this invention; and FIG. 9 is an isometric view of the rotor and magnetic biasing assembly utilized in the fluid flow rate control device of this invention.

DETAILED DESCRIPTION OF THE PREFERRED EMBODIMENT

Figure 1:
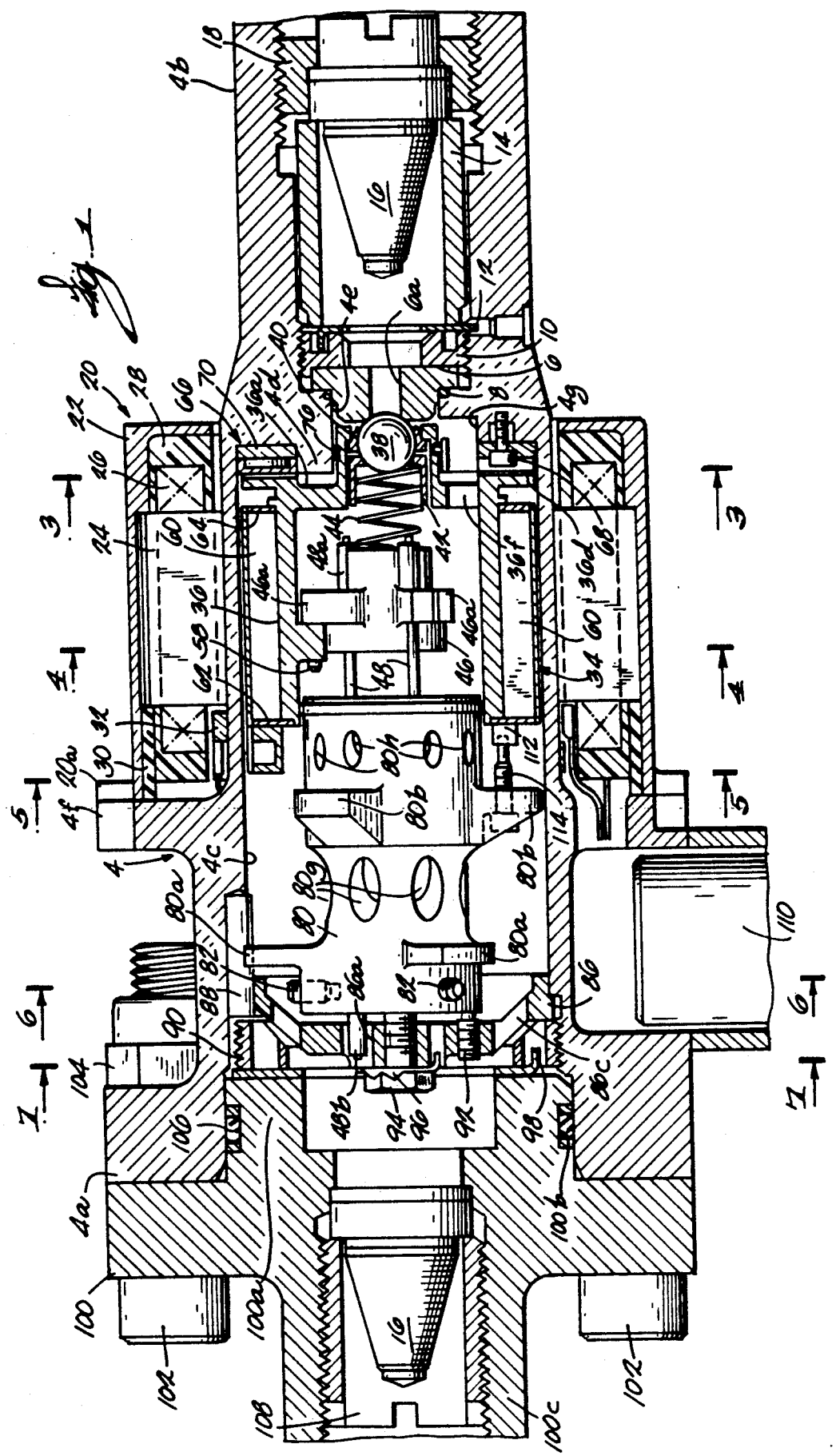
FIG. 1 is a cross sectional view taken longitudinally along a center line of the fluid flow rate control device of this invention, having the opposite ends of conduit connection portions and a portion of an electrical connector broken away.

Referring to the drawings and particularly FIGS. 1 and 2 thereof, the fluid flow rate control device 2 constructed in accordance with this invention comprises a substantially cylindrical housing 4 made of a high strength non-magnetic material. The left-hand end of housing 4 is provided with a flange 4a; the right-hand end of housing 4 comprises a reduced diameter conduit 4b, the open interior of which forms a portion of an outlet passage for the device 2. A large substantially cylindrical bore 4c extends internally of housing 4 from the left-hand end thereof, ending at a right-hand end wall 4d, defining an interior chamber for the valve device 2. A central axis for housing 4, its cylindrical bore 4c, conduit portion 4b, and other circular cross sectional features of the housing also is coaxial with a rotor, poppet, support tower and other elements of the device 2 as will become more apparent in the following description. For example, end wall 4d has an opening 4e communicating between the outlet passage opening in conduit 4b and the interior chamber defined by bore 4c. A shouldered cylindrical valve seat 6 is inserted through the opening in conduit portion 4b whereby a reduced diameter hub of the valve seat 6 extends into the opening 4e and an enlarged annular shoulder of the valve seat 6 abuts against a surface of end wall 4d, trapping an annular seal 8 therebetween. A ring-type spanner nut 10, having a central aperture therethrough and a concentric shallow recess in the left-hand face thereof for receiving valve seat 6 therein, is threaded into an internally threaded portion of the interior opening in conduit portion 4b to secure valve seat 6 firmly against end wall 4d. A tab washer 12 locks spanner nut 10 in place. A bushing 14 is positioned in the interior opening of conduit portion 4b against the back side of tab washer 12. The right-hand end of bushing 14 serves as a seat against which a filter 16 is held by a nut 18 threadably inserted within an enlarged diameter internally threaded portion of the interior opening of conduit portion 4b. Valve seat 6 has a central aperture 6a therethrough which is aligned with apertures in spanner nut 10, locking tab washer 12, and nut 18 to communicate with the interior opening in conduit portion 4b to define an outlet passage for the device 2.

A stator assembly 20 is slidably disposed over housing 4 from the right-hand end thereof, the assembly 20 having a flanged left-hand end 20a which abuts against and is fastened to an intermediate annular flange 4f of housing 4 by cap screws and locking nuts or the like (not shown). Stator assembly 20 comprises a cup-like housing 22 of a non-magnetic material in which a laminated stator 24 having a plurality of electric windings 26 is secured by potting material 28. An electrically insulating spacer sleeve 30 is disposed adjacent the interior of housing 22 at the flanged end 20a. The potting material 28 is counterbored at the flanged end 20a to provide clearance for a position sensing ring 32 which is affixed to the external surface of housing 4 immediately to the right of intermediate flange 4f (FIGS. 1 and 2). Position sensing ring 32 has a plurality of Hall effect devices mounted thereon to detect the rotary position of the rotor (armature) of the brushless DC motor established by the stator assembly 20 and the rotor (armature) assembly 34.

The rotor assembly 34 comprises a cylindrical body 36 having a right-hand end wall 36a made of corrosion resistant ferromagnetic material. A hub 36b projects axially to the right from end wall 36a and is provided with a central aperture therethrough. A ball poppet 38 mounted in an arcuate-sleeve retainer 40 is trapped against an interior shoulder at the distal end of hub 36b by a cap 42 which is biased against a surface of ball poppet 38 by a spring 44. The hollow interior of rotor body 36 is provided with three annularly arranged equally arcuately spaced tabs 36c which define a bayonet-type connection flange. A cable guide 46 is provided with three equally arcuately spaced projections 46a which are slotted from their distal ends inward and counter-bored in a right-hand surface to receive the ends 48a of flexible bands 48. Bands 48 are preferably multi-stranded flexible cables but could be long flexible strips of material or other type of flexible band as desired. The end 48a of each respective cable comprises a cup-like grommet 50 having a hole therethrough for the cable and a counterbore at one side for a tube 52 which is swaged to the end of the cable 48, the left-hand end of tube 52 being positioned within the counterbore of grommet 50. The opposite ends 48b of respective cables 48 have a grommet 54 disposed thereover and a tube 56 swaged to the end thereof, the right-hand end of tube 56 fitting within a corresponding counterbore in the left-hand end of grommet 54.

Right-hand ends 48a of cables 48 are attached to the cable guide 46 by inserting the cables into the slots at the ends of the respective projections 46a and positioning the grommet 50 within the cylindrical counterbore in the right-hand surface of the respective projections and then tack welding the grommets 50 to the guide 46. This assembly of cables 48 and cable guide 46 is then inserted into the cylindrical rotor body 36 with the projections 46a of cable guide 46 aligned with the spaces between the tabs 36c of the bayonet connection flange. Cable guide 46 is subsequently rotated to align the respective projections 46a with tabs 36c to block withdrawal of cable guide 46 from the rotor body 36. Spring 44 seats within a shallow recess at the right-hand end of cable guide 46 to be compressed between the cable guide and cage 42. Cable guide 46 may be tack welded to rotor body 36, or a mechanical connection may be provided by a pin 58 press fit into aligned holes in one of the aligned tabs 36c and projections 46a, or both.

Eight permanent magnets 60 are positioned to the outer periphery of rotor body 36 and covered by a non-magnetic cup 62 which is disposed over the rotor body from the left-hand end thereof. An end plate 64 is attached to the right-hand end of rotor body 36 and to the outer wall of cup 62 such as by welding or the like. After assembly of cup 62 and end plate 64 to the rotor body 36, the outer diameter of cup 62 is machined down to a specific clearance diameter for the interior chamber defined by cylindrical bore 4c of housing 4. As may be seen in FIGS. 2 and 4, the wall thickness of cup 62 directly over permanent magnets 60 is extremely thin and much more readily achieved by machining after assembly.

A flange 36d is provided on rotor body 36 to provide an annular disk-shaped magnetic face 36e as best seen in FIG. 9. Face 36e cooperates with an annular magnetic bias assembly 66 which is secured to end wall 4d within the interior chamber by screws 68 as best seen in FIGS. 3 and 9. Magnetic bias assembly 66 comprises a ferromagnetic backing ring 70 to which three arcuate segments 72 are attached by welding or the like. Each of the segments 72 is a non-ferromagnetic member having four equally spaced cylindrical pockets 72a (FIG. 9) in the rear face thereof. Each of the pockets 72a receives a disk-shaped permanent magnet 74, preferably made from rare earth material such a neodymium-iron-boron, and polarized such that one face of the disk is the north pole and the opposite face thereof is the south pole. The magnets 74 are positioned in their respective pockets 72a with alternate ones of said magnets arranged to have the poles reversed with respect to the adjacent magnets. Thus strong magnetic fields are set up within the backing ring 70 and within the disk shaped flange 36d of rotor body 36 to provide a magnetic attractive force in the right-hand axial direction as viewed in FIGS. 1 and 2 on the rotor body 36. Rotor assembly 34 is mounted for rotary and axial sliding movement upon two annular sleeve bearings 76 and 78. Bearing 76 is positioned in an annular groove in the surface of hub 36b of rotor body 36 and cooperates with the interior surface of opening 4e in housing 4. Bearing 78 is disposed in an annular groove in the exterior surface of a support tower 80 to cooperatively engage with the interior surface of rotor body 36. Rotor assembly 34 freely rotates on bearings 76 and 78 as well as slides axially thereover as will be described more fully hereinafter. As best seen in FIGS. 2, 3 and 9, end wall 36a of rotor body 36 is provided with three arcuate openings 36f and the end wall 4d of housing 4 is provided with three corresponding openings 4g spaced around opening 4e. Openings 4g are offset radially to project through the wall of opening 4e to the left of valve seat 6 to provide a fluid flow path from the interior chamber of the device to the outlet passage.

Support tower 80 comprises a substantially cylindrical member of non-ferromagnetic material having a first flange near its left-hand end as viewed in FIGS. 1 and 2 comprising three equally spaced radially extending arms 80a and a second flange near the right-hand end thereof comprising three equally spaced radially extending arms 80b, the arms 80b being arcuately offset 60° to bisect the spaces between the arms 80a. The outer ends of arms 80a and 80b rest on the surface of cylindrical bore 4c to position the support tower 80 within the interior chamber. Support tower 80 is a hollow member having a cylindrical internal bore 80c open to the right-hand end adjacent rotor assembly 34 and substantially closed at the opposite, left-hand thereof. The left-hand end of support tower 80 is provided with a central aperture 80d having a threaded bushing therein and three equally arcuately spaced holes 80e extending through the left-hand end wall. Holes 80e receive grommets 54 of cables 48 and therefore are formed on the same diameter centers as are the locating counterbores which receive grommet 50 in cable guide 46 such that the opposite ends 48a and 48b of the respective cables 48 are correspondingly aligned and axially parallel to the axis of the device and the rotational axis of rotor assembly 34. Grommets 54 of cables 48 are axially positioned within the holes 80e to establish a predetermined overall dimension for the valve opening assembly comprising support tower 80 and rotor assembly 34, and are then clamped within the holes 80e by set screws 82 threadably received in holes formed in support tower 80 which intersect the holes 80e.

A spacer 84 is disposed between the three cables 48 and supported thereon within the cylindrical bore 80c in support tower 80 as best seen in FIGS. 2 and 5. Each of the cables 48 has a bulbous portion formed thereon such as a ball 48c swaged on the cable intermediate its ends. Spacer 84 is in the form of a spider having a hub with a central aperture 84a therethrough and three equally angularly spaced radially extending arms 84b, the length of which defines a clearance diameter within the bore 80c. The ends of each of the legs 84b are slotted to receive the cables 48 therethrough and have a cylindrical recess formed therein to receive the respective ball 48c, thereby spacing the cables radially at the identical diameter as the respective ends 48a and 48b are spaced and locating the spacer 84 axially in the support tower assembly. The left-hand end wall of support tower 80 is provided with another plurality of openings 80f and the side walls thereof are provided with a plurality of angularly disposed openings 80g and 80h to provide fluid flow path through the support tower 80, past the arms 84b and through the aperture 84a of spider 84 to the rotor assembly 34.

A circular bridge 86 is positioned in the open end of the bore of housing 4 over the left-hand end of support tower 80. The relative rotational positions of bridge 86 and support tower 80 are secured by a pin 88 which is inserted in a hole drilled partially into housing 4 and partly into bridge 86 and one of the arms 80a of support tower 80 as seen in FIGS. 2, 6, and 7. A spanner nut 90 is threadably inserted in an internally threaded counterbore at the left-hand end of interior chamber 4c to hold bridge member 86 in position. Bridge 86 is provided with a first set of clearance holes 86a through which the tubes 56 of cable ends 48b project, a second plurality of holes 86b which threadably receive set screws 92 extending axially therethrough to abut against the left-hand end of support tower 80, and a plurality of holes 86c which provide for fluid flow through the bridge to the support tower 80. Bridge 86 also has a central aperture 86d through which a bolt 94 extends and threadably engages the bushing in central aperture 80d of support tower 80. The position of the valve opening assembly, i.e. support tower 80, cables 48 and rotor assembly 34, within the interior chamber 4c is adjusted by rotating bolt 94 to draw the valve opening assembly leftward, separating the face 36e of disk-like flange 36d of rotor 36 from the biasing magnet assembly 66 in end wall 4d. This adjustment picks up various clearance tolerances whereby poppet 38 remains biased into closing engagement with valve seat 6, but will begin to lift off that seat in the next increment of leftward axial movement of rotor 36. An air gap is established between disk face 36e and the biasing magnet assembly 66 and an initial or extreme axial position for the rotor is defined. A key-type washer 96 is disposed between the head of bolt 94 and the bridge 86. Washer 96 has a first tab that is engaged in an opening therefor in bridge 86 and second tabs that are formed up over one point of the hexagonal head of the bolt to lock the same after the appropriate adjustments have been made. A locking ring washer 98 is also provided over spanner nut 90 to secure nut 90 in place.

A filter housing 100 is attached to the left-hand end of housing 4 by a plurality of cap screws 102 passing through holes in appropriate flanges of filter housing 100 and housing 4 and engaging locking nuts 104 as seen in FIGS. 1 and 2. Filter housing 100 has a hub 100a projecting into a counterbored left-hand end of the housing 4, the hub 100a having an annular groove 100b therein to receive a seal 106 which cooperates between the internal counterbore of housing 4 and the hub 100a. Filter housing 100 also has a reduced diameter conduit 100c extending to the left the conduit having an opening therethrough communicating with the interior chamber 4c of housing 4 to define an inlet passage for the device. As in the outlet passage, another filter 16 is disposed in the inlet passage and held in place by a ring-type nut 108 which threadably engages an internally threaded portion of the opening of conduit 100c.

To operate the fluid flow rate control device, the brushless DC motor is controlled by a microprocessor based electronic control system. Wire connections for the windings and for the position sensing ring 32 are made through a connector 110 affixed to housing 4. Energization of the appropriate windings 26 generates a magnetic field that interacts with permanent magnets 60 to cause rotor assembly 34 to rotate counterclockwise as viewed in FIG. 5 through a predetermined increment of some maximum interval as physically determined by pins 112 inserted into the left-hand face of rotor body 36 engaging with a stop screw 114 threadably inserted through an opening in one of the arms 80b of support tower 80.

A magnet housing 116 is attached to the left-hand face of rotor body 36, the housing containing one or more permanent magnets 118. As seen in FIG. 2, the housing 116 aligns the magnets 118 with the position sensing ring 32. The angular position of rotor assembly 34 is thereby detected by Hall effect device sensors or similar elements carried by the ring 32 operated by the permanent magnets 118 as the latter move with the rotor through the angle of rotation. The signal is fed back to the microprocessor wherein it can be utilized to change the rotational position of the rotor and to provide a signal as to the axial position of poppet 38 with respect to the valve seat.

Referring also to FIG. 8, as rotor assembly 34 20 rotates about the rotational axis, the bands 48 twist about their fixed end 48b in support tower 80. This twisting effects foreshortening of the axial component of the bands such that rotor assembly 34 is pulled axially away from valve seat 6, thereby disengaging poppet 38 from valve seat 6. The amount of axial displacement or lift of poppet 38 from the valve seat increases as the degree of rotation increases, thereby providing a variable lead or lift to the poppet 38 from the valve seat. The variable lead provides maximum force in the axial direction to overcome the closing force and high pressure of the fluid upon initial opening. Thereafter, the pressure diminishes in proportion to the amount of opening and the force decreases correspondingly as the rotor goes through an increased movement. The amount of axial displacement or lift for the rotor and poppet 38 is increased by the addition of the spacer 84 intermediate the ends of bands 48. Spacer 84 effectively modifies the point at which the bands are allowed to twist together. Spacer 84 rotates within the cylindrical cavity 80c of support tower 80 in response to rotation of rotor assembly 34 and as can be seen in FIG. 8, the spacer 84 travels through one-half the arcuate movement of rotor assembly 34. In contrast to a rotor assembly without the spacer 84 where the bands tend to close in intermediate their ends as the rotor 34 turns, this rotor assembly with the spacer keeps the bands apart and forces them to maintain their radial spacing during rotation which increases the amount of axial translation with respect to the same amount of rotational displacement of rotor assembly 34.

Although the fluid flow rate control device shown and described herein in a preferred and best mode contemplated embodiment, it is to be understood that it is susceptible of various modifications without departing from the scope of the appended claims.

We claim:

1. A fluid flow rate control device comprising:
   a housing having an inlet passage, an interior chamber communicating with said inlet passage, an outlet passage leading from said interior chamber, and a valve seat disposed in said outlet passage;
   a brushless DC motor in said housing having a rotor supported in said interior chamber, bearing means providing for free rotary movement of said rotor about a rotational axis and for free axial sliding movement of said rotor along said rotational axis independent of said rotary movement thereof, openings in said rotor permitting fluid passage therethrough, said rotor carrying a poppet engaging said valve seat to close off said outlet passage from said interior chamber in an extreme axial position of said rotor; and
   means effecting axial translation of said rotor in response to rotation thereof for moving said poppet away from said valve seat comprising a plurality of flexible bands having first ends attached to said rotor at angularly spaced intervals and second ends fixedly secured relative to said housing at points axially spaced from said rotor and correspondingly angularly spaced with said first ends, said bands being disposed parallel to said rotational axis in said extreme axial position of said rotor, rotation of said rotor twisting said bands from said parallel disposition to effect foreshortening thereof in an axial direction and translation of said rotor away from said valve seat.

2. A fluid flow rate control device as claimed in claim 1 wherein said means effecting axial translation of said rotor further comprises a spacer disposed between said bands intermediate said first and second ends thereof and being rotatable substantially about said rotational axis, said bands being connected to said spacer and rotating said spacer in response to rotation of said rotor, said spacer effecting increased twisting of said bands between said spacer and said rotor to thereby increase said foreshortening and said axial translation of said rotor.

3. A fluid flow rate control device as claimed in claim 2 wherein said spacer is suspended by said bands.

4. A fluid flow rate control device as claimed in claim 3 wherein said plurality of flexible bands comprises at least three and said spacer comprises a spider having a central hub portion with radially extending legs equal in number to said bands and an aperture through said hub to minimize impedance to fluid flow by said spacer.

5. A fluid flow rate control device as claimed in claim 1 further comprising a support member disposed in said interior chamber, and wherein said bearing means comprises first bearing means disposed between said rotor and said support member.

6. A fluid flow rate control device as claimed in claim 5 further comprising permanent magnet means biasing said rotor toward said extreme axial position.

7. A fluid flow rate control device as claimed in claim 6 wherein said poppet is movable axially relative to said rotor and is biased toward said valve seat, said poppet being displaced against said bias in said extreme axial position of said rotor, and said second ends of said flexible bands are secured to said support member, and further comprising adjustment means for positioning said support member axially within said interior chamber, thereby determining said extreme axial position of said rotor and displacement of said poppet at said extreme position of said rotor.

8. A fluid flow rate control device as claimed in claim 7 wherein said adjustment means comprises a screw fixed against axial movement relative to said housing and threadably connected with said support member, rotation of said screw effecting axial movement of said support member.

9. A fluid flow rate control device as claimed in claim 7 wherein said adjustment means comprises a bridge fixed to said housing within said interior chamber and a screw rotatably supported in said bridge threadably engaging said support member, said support member moving axially in response to rotation of said screw.

10. A fluid flow rate control device as claimed in claim 9 wherein said bridge further comprises set screws threadably adjustable toward said support member for abutting said support member, thereby cooperating with said adjustment means screw for locking said support member axially within said chamber.

11. A fluid flow rate control device as claimed in claim 8 wherein said flexible bands second ends are axially slidable relative to said support member, and said support member comprises clamping means engaging said second ends, thereby providing stepless adjustment of axial length of said support member and said rotor.

12. A fluid flow rate control device as claimed in claim 11 wherein said clamping means comprises set screws clamping said flexible bands second ends within apertures in said support member.

13. A fluid flow rate control device as claimed in claim 7 wherein said support member comprises a cylindrical cavity concentric with said rotational axis open at an end adjacent said rotor said flexible bands extending into said cavity from said rotor, and said means effecting axial translation of said rotor further comprises a spacer disposed between said bands within said cavity, said bands being connected to said spacer intermediate said respective first and second ends thereof and rotating said spacer in response to rotation of said rotor, said spacer effecting increased twisting of said bands between said spacer and said rotor to thereby increase said foreshortening and said axial translation of said rotor.

14. A fluid flow rate control device as claimed in claim 13 wherein said spacer comprises a spider having a central hub with legs radiating to each of said flexible bands, and cooperating means on said bands and said legs connecting said bands to said spider.

15. A fluid flow rate control device as claimed in claim 14 wherein said cooperating means on said bands and legs comprise recesses in distal ends of said legs extending radially inward, slots open to said distal ends of said legs extending axially, said slots being narrower than said recesses and bisecting respective said recesses, said bands each comprising a bulbous portion thereon disposed in a respective said recess, said band being disposed in a respective said slot.

16. A fluid flow rate control device as claimed in claim 6 wherein said permanent magnet means is disposed in said housing at an end wall of said interior chamber proximate said valve seat, said permanent magnet means magnetically axially attracting an adjacent end of said rotor.

17. A fluid flow rate control device as claimed in claim 16 wherein said rotor comprises an annular ferromagnetic flange having a face disposed parallel to said end wall, and said permanent magnet means comprises an annular arrangement of plural permanent magnets, each having their poles arranged in an axial direction of said device and alternate ones of said permanent magnets having their poles arranged in reverse axial direction.

* * * * *